Nov. 5, 1963 R. E. FUHRMAN 3,109,411
CONTROL DEVICE
Filed July 11, 1961

*INVENTOR.*
RICHARD E. FUHRMAN
BY
*ATTORNEY*

United States Patent Office 3,109,411
Patented Nov. 5, 1963

3,109,411
CONTROL DEVICE
Richard E. Fuhrman, Oak Park, Ill., assignor to General
Electric Company, a corporation of New York
Filed July 11, 1961, Ser. No. 123,219
5 Claims. (Cl. 116—124)

This invention relates to control devices such as thermostatically actuated switches for electric appliances such as cooking ovens for electric ranges, and in particular to a thermostatically actuated switch having a knob by means of which the thermostat is adjusted for operation at a desired temperature, and a dial plate rotatable relative thereto, said dial plate having means for adjusting the dial relative to a calibration index on the knob when the thermostat is being initially calibrated, or if re-calibration is required to adjust the thermostat to actual operating conditions.

Specifically, the invention comprises an improvement on that disclosed and claimed in Coultrip U.S. Patent 2,179,281, patented November 7, 1939, for "Control Device" and assigned to my present assignee. In said Coultrip patent the control device includes an adjustment knob having an integral dial; said knob is non-rotatively related to the control shaft by means including a shaft-mounted fitting having an axially extending lug which enters a hollow interior portion of the knob. This hollow portion is of sufficient angular extent to permit a relatively large rotational adjustment of the knob on the shaft. An adjustment plate removably mounted within the knob has a slot just wide enough to accommodate the passage of the lug whereupon when it is necessary to relate the knob to the shaft in an angular position representing the calibration temperature, the plate is rotatably adjusted relative to the knob and its dial, and then is made secure on the knob.

This arrangement was very adequate and was used in hundreds of thousands of thermostats manufactured by applicant's assignee. However, it proved to be unnecessarily complex, and too costly to manufacture and assemble for present economic conditions. In a presently preferred embodiment, the present invention provides a knob having a D-shaped axial passage to non-rotatably receive the cooperatively flattened control shaft of the thermostat. The invention further includes a dial which is structurally independent of the knob itself. A wall in the rear of the knob defines a recess which is concentric with the control shaft. This wall has a plurality of notches formed therein, as in the Coultrip invention, but instead of the independent adjustment plate and shaft-mounted lug fixture of the Coultrip invention, I provide a tongue on the dial arranged for engagement with any one of the notches provided within the knob. The knob has a calibration index marked on a surface easily apparent to the technician; this index marking is on the same radius as the apex of the central one of the series of notches. The apex of the tongue on the dial is on the dial radius which is identified with the temperature corresponding to the temperature against which the thermostat will be calibrated following its manufacture. In a calibration procedure, the dial is placed on the knob with the tongue of the dial seated within the central notch, whereupon the thermostat is subjected to the calibration temperature in a test fixture. If proper operation occurs when the knob and its associated dial is rotated to a position at which the temperature marking of the dial coincides with a fixed point of reference, the thermostat is properly operating and no adjustment of the dial relative to the knob is required. On the other hand, if the thermostat operated a few angular degrees before the marking of the dial attains the reference point, or does not operate until the dial is rotated a few degrees beyond said point, the dial can be loosened on the knob and angularly adjusted relative to the shaft so that its tongue will seat in a notch to the right or the left of the center notch, as the case may be, so that a coincidence of the dial marking with the reference point will accurately represent the calibration temperature. For convenience, as in Coultrip, each of the notches to the right or to the left of the central notch can represent a fixed temperature differential with respect to its immediately preceding notch.

It is therefore a principal object of the present invention to provide a thermostat having calibration means which are of exceedingly simple construction, of low manufacturing cost, and capable of being practiced by unskilled technicians in a mass production facility. A feature of the invention consistent with this object is that means are provided whereby the workman can position and secure the dial in concentric relation to the dial shaft whereby there is no possibility of fixing the dial on the knob in an eccentric relationship therewith.

Other features and advantages of the invention will be apparent from the following detailed description of a presently preferred embodiment, read in connection with the accompanying drawings in which:

FIG. 1 is a front elevational view of the knob and dial showing a typical application to a fragmentarily represented backsplasher portion of an electric range or the like;

Figure 2:
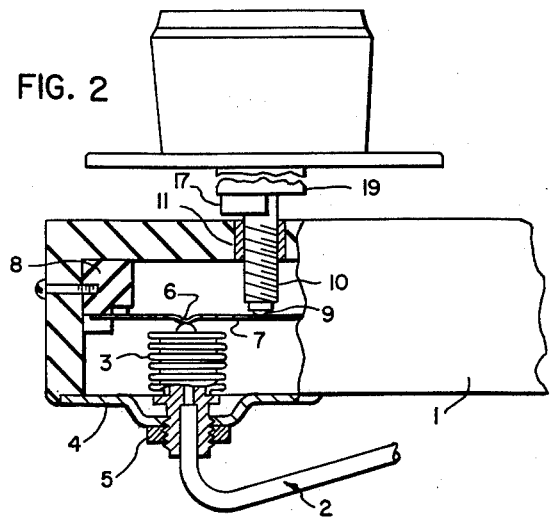
FIG. 2 is a partially sectioned side elevation of a typical thermostat to which the dial and calibration device has been applied.

Referring first to FIG. 2, the invention is applied to a thermostat 1 of any known or conventional type, for example, contemporary thermostats generally used for controlling the temperature of ovens of electric ranges. Such thermostats utilize a system 2 having any conventional means such as a "bulb" (not shown) exposed to the air temperature of the oven. A tube system filling of the type which exhibits predictable and repetitive changes in vapor pressure as the bulb temperature rises or falls causes the associated bellows mechanism 3 to expand or contract, as well known in the art. Equivalently, of course, the control mechanism may be of a purely pressure-actuated type having an open ended tube system pursuant to which the bellows will expand or contract according to the increase or decrease in the gas or liquid pressure to which the tube system was exposed.

One end of the bellows is rigidly secured to a base plate 4 of the thermostat housing. It is conventional practice to thread an end of the bellows mounting and utilize a locknut 5 to affix the tube end of the bellows to the base plate. Among other things, this provides axial adjustability whereby the free end of the bellows will be in proper operative relationship with a dimple or fulcrum point 6 of the flexible blade-like member 7. The member 7 is mounted at one end on a fulcrum block 8 within the thermostat, and at its free end (not shown) carries contact elements which cooperate with fixed contacts (not shown) within the thermostat to accomplish the switching function. In assumed application of the thermostat to an electric range oven, the switching contacts would comprise a primary switch mechanism for energizing and deenergizing the resistance heating units with which the oven is equipped.

As is the conventional practice the dimple 6 of the blade is intermediate the fulcrum block 8 and the spherical end 9 of a threaded adjustment shaft 10. Said shaft operates within an appropriately threaded sleeve 11 fixed within the thermostat housing and according to the direction of rotation of the shaft will impose more or less pressure on the blade 7. In the condition shown in FIG. 2 the expansion of the bellows 3 representative of an increasing vapor pressure within the tube system would cause the blade to bow upwardly, whereupon the sharp downward movement of the free end of the blade, as accomplished by the usual overthrow spring (not shown), would cause its associated contacts to move with a snap action into one or another switching relationship with the fixed contacts. Similarly, a retraction of the bellows would cause the blade portion to straighten out with resulting upward movement and action of the movable contacts to an opposite electric switching condition. It is obvious, therefore, and well known in the control device art, that screwing inwardly on the shaft increases the bowed condition of the blade whereupon a lesser expansion of the bellows 3 is required to accomplish the switching function. Withdrawing the shaft 10 from the blade will permit it to straighten out in its portion between the points 8 and 9 and a greater expansion of the bellows, representative of a substantially higher temperature within the range oven, is required to effectuate the switching operation.

It is the practice in the manufacture of thermostats of any type to select an appropriate point in the contemplated operating range of the device against which to calibrate the thermostat operation. Frequently, of course, it is the practice to select more than one calibration temperature and to test the operation of the thermostat against each of the several values. For the purpose of illustration, however, it will be assumed that the thermostat will be calibrated against a single temperature condition approximately midway of the total operating range of a range oven; for example, a calibration temperature of 350° F.

Figure 6:
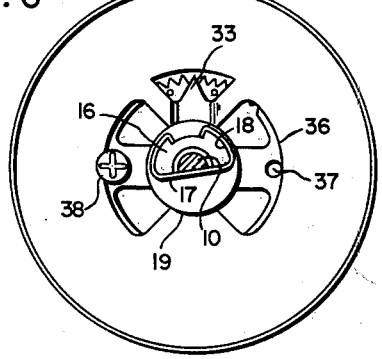
FIG. 6 is a rear view showing the application of the dial to the control knob of FIG. 3.

The shaft 10, known in the art generally as a "control" shaft, has a suitably flattened portion (not shown) which fits snugly within the D-shaped axial recess 14 of the control shaft knob 15. The knob has a portion 16 shaped to accommodate a snap spring 17 (FIGURE 6) by means of which the knob is frictionally secured to the shaft 10. It will be observed from FIG. 6 that the arcuate shoulders 18 of the knob portion 16 are concentric with a cylindrical hub 19 of the knob and that said arcuate shoulders are spaced inwardly of the hub 19 an amount slightly greater than the thickness of the snap spring 17. The purpose of this is, as later more fully explained, to make the hub 19 an accurate centering guide for the application of the control dial to the knob. The invention is applicable also to knobs which do not have the extending hub 19. Such a knob, exemplified in FIG. 4, will have a circular marking, as at 19a, on the wall defining the base of the recess 20. In all other respects, the knobs of FIGS. 4 and 6 may be identical.

Figure 1:
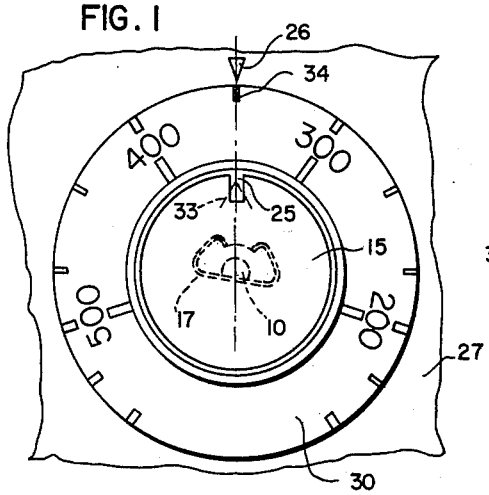

The upper portion 21 of the wall 22 outlining the recess 20 is formed with a plurality of notches 23, as in the Coultrip patent. The centermost notch, 24, is a reference notch, and is on the same radius as the center line of a calibration index mark 25 on the external surface of the knob, as shown in FIG. 1. Each of the remaining notches is angularly related to the notch 24 to represent a 10-degree F. departure from the control temperature typified by the said notch 24, when the index mark 25 is in vertical alignment with a reference index point, the mark 26 on the backsplasher 27 or other mounting wall of the range, or on a wall of a calibration test fixture. In other words, when the knob index marking 25 is in such relationship with the reference point 26, the thermostat should operate to break its contacts as the bulb senses a 350° F. temperature and to re-close its contacts at whatever amplitude is built into the thermostat contact blade system. It will be apparent from FIG. 4 that the series of notches extend over a substantial portion of the circumference of the knob. Illustratively, this is about one-quarter of the circumference, and is an even larger percentage of the extent of rotation of the knob necessary to accomplish the full operational range of the thermostat.

The thermostat may, during its manufacture, be calibrated with its control dial in place and the complete assembly of knob and dial be representative of the correct calibration condition. However, it is known to those familiar with mass-produced appliances that at times a thermostat calibrated under factory-controlled conditions will not exhibit the same characteristics when it is applied to a device such as a range oven which may have inconsistent operational conditions. Therefore the present invention provides not only for the accurate relationship of the thermostat dial to the operation of the thermostat under factory conditions but for the simple re-alignment of the dial relative to the knob when the actual performance of the thermostat on its associated range necessitates a re-calibration of the assembly.

Figure 3:
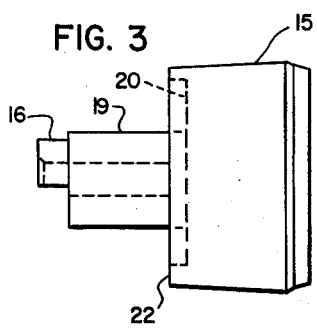
FIG. 3 is a side elevational view of one form of the control knob.

The control dial 30 (FIG. 5) is advantageously stamped from light sheet metal such as aluminum and is appropriately inscribed with index markings as required to delineate its operating range. The important aspects of the dial as related to the present invention are that the dial is rotatable relative to the thermostat shaft and the knob fixed thereto, and that to maintain concentricity of the dial relative to the shaft 10 the central portion of the dial is defined by two arcs, respectively 31 and 32, which have the same radius as the hub 19 of the knob (or the equivalent guide circle if the knob is without a hub). Further, it is important that the dial have a tongue 33, the apex of which is precisely on the same radius as the dial index marking 34, which is previously stated, is representative of the 350° F. calibration temperature. It will be observed by way of the shading on FIG. 5 that the tongue 33 is raised above the facial surface of the dial so that when the dial is inverted and applied to the knob the tongue will occupy the recess 20 in the rear of the knob and thus be operatedly associated with the notches 23, 24, etc. in the dial wall 21. In the application of the dial to the thermostat knob of FIG. 3, the dial is passed over the hub 19 and the tongue 33 seated within the indexing notch 24 of the knob. For the guidance of the workman in assembling the dial to the knob in this relationship the base wall of the recess 20 is provided with a pair of small projections 35 which are equally spaced on either side of the notch 24, and arranged so that they will not be obscured by the tongue or the dial when the dial is applied. These projections constitute adequate guide markings. In applying a dial to the FIG. 4 type, the workman is guided by the coincidence of the arcuate portions 31 and 32 with the reference circle 19a, whereupon in either dial form, it is easily within the grasp of the unskilled workman to align the dial to the knob 15 without mis-alignment or skewing which might bring its indexing marking out of registration with the marking 25 on the knob. It will be noted that the arcuate portions 36 of the dial are substantially coincident with the effective diameter of the screwholes 37, whereupon the workman then makes the dial secure on the knob by tightening the screws 38 (only one shown in FIG. 6) to bring the heads thereof into tight frictional securement with the dial.

Figure 4:
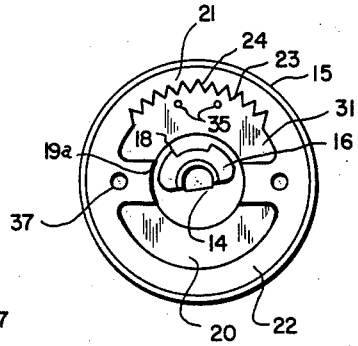
FIG. 4 is a rear elevational view of another form of control knob.
Figure 5:
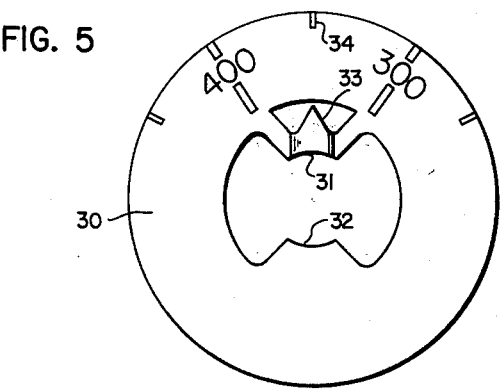
FIG. 5 is a front elevational view of the dial.

It is possible for manufacturing tolerances to accumulate so that when the marking 25 on the knob is in alignment with the external reference point the thermostat will not function at the predetermined calibration temperature. In the average situation this is not at all important from the point of view of the ultimate user so long as the markings on the dial itself are representative of the actual operating temperatures. In other words, it is the dial marking and not the knob index marking 25 (which may be made relatively inconspicuous and meaningless as related to the user's understanding of it) which indicates to the user that the thermostat is properly operating. Therefore, in the circumstance that the radial alignment of the tongue 33, the knob index marking 25, the dial temperature marking 34, and the reference index 26, is not productive of the proper thermostat operation, the screws 38 may be loosened and the tongue 33 engaged within one or another notch on whichever side of the notch 24 is appropriate. For example, it will be assumed that those notches to the left of notch 24, as viewed in FIG. 4, represent an increase of 10 degrees Fahrenheit per notch and those to the right represent a decrease of that amount per notch. Therefore, if with the tongue 33 in notch 24 the coincidence of the dial index marking 34 and the reference point 26 does not produce operation of the thermostat at the 350° level, it would indicate that the thermostat control shaft 10 should be withdrawn so as to require more expansion of the bellows 3 to actuate the blade 7. This requires an adjustment of the dial relative to the knob so that the required extra rotation of the shaft 10 will bring the dial marking 34 into registry with the index 26. The dial 30 is therefore loosened on the knob and its tongue 33 put into one of the notches to the left of notch 24; the calibrator of the thermostat quickly gains the experience necessary to perform the adjustment.

The field service man, on the other hand, is apt not to be so adept at re-calibration if it is found that conditions peculiar to a specific range require that the thermostat be re-calibrated in the field. The unity of the dial and its calibration tongue greatly simplifies the operation for the service man because he can withdraw the dial from the control shaft, loosen the screws sufficiently to permit enough play in the dial relative to the knob to shift the tongue in the appropriate direction relative to the notches in the knob, and then by holding the dial and knob in the adjusted position but without re-tightening the screws can return the knob and dial assembly to the shaft and operate the thermostat as required to check the tentative re-calibration. If he has miscalculated in one or another direction of adjustment, it is not necessary for him to again remove the knob and dial assembly from the shaft for he can manipulate the dial relative to the knob while the knob remains on the shaft, it being understood that the knob is not then fully seated on the shaft but is just sufficiently in position to accomplish rotation of the shaft by rotation of the knob. When he has attained the correct readjustment of the dial he will remove the assembly from the shaft, maintaining the engagement of the dial tongue and the knob and retighten the screws. In devices based on the above noted Coultrip patent, this readjustment is not so expeditiously accomplished because the knob is free to rotate on the shaft and it is necessary always to re-tighten the adjustment plate before the thermostat shaft could be rotated. This could require several removals of the knob, loosening of the screws each time to permit adjustment of the plate, and then re-tightening the screws in order to permit the rotation of the thermostat shaft by the plate.

While there has been described what is at present thought to be a preferred embodiment of the invention, it will be understood that it is intended to cover in the appended claims all modifications which fall within the true spirit and scope of the invention.

What is claimed is:

1. A control device comprising a control shaft, an operating knob for said shaft, an indexing device on said knob, means for mounting said knob on said shaft whereby a predetermined angular departure of said indexing device form a reference point will effect operation of said control device at a predetermined calibration condition, said knob having wall means defining a recess formed in a surface thereof transverse to the axis of said shaft, a portion of said wall means having a succession of notches arranged in an arc concentric with said shaft, one of said notches and said knob indexing device being disposed substantially along a common radius of said arc and each other of said notches being on radii having uniform angular departures from said common radius, means for identifying said one notch, a dial having a plurality of markings angularly arranged about at least a portion of the circumference thereof to indicate various operational settings for said control device, one of said markings identifying the predetermined calibration condition, means for mounting said dial on said knob for rotation relative thereto, means for positionng said dial with the lastnamed dial marking in a desired angular relation to said knob indexing means, comprising a tongue on said dial engageable with any one of the notches on said knob, said tongue having a fixed angular relation to said one dial marking, and means for securing said dial against further displacement relative to said knob following the engagement of said tongue within a selected notch.

2. A control device comprising a shaft for setting the device to operate at a selected physical condition within a predetermined range, a knob for rotating said shaft, an indexing device on said knob, means for fixing said knob on said shaft whereby a predetermined angular departure of said indexing device from a reference point will effect operation of said device at a predetermined calibration condition, said knob having wall means concentric with the axis of said shaft, a portion of said wall means having a succession of notches formed therein in a plane normal to said shaft, one of said notches and said knob indexing device being disposed substantially along a common radius of said arc and each other of said notches being on radii having fixed, predetermined, angular departures from said common radius, means for identifying said one notch, a dial having a plurality of markings angularly arranged about at least a portion of the circumference thereof to indicate various operational settings for said control device, one of said markings identifying the predetermined calibration condition, means for mounting said dial on said knob for rotation relative to said shaft, means for fixing the last-named dial marking in a desired angular relation to said knob indexing means, comprising a tongue integral with said dial and optionally engageable with any one of the notches on said knob, said tongue having a fixed angular relation to said one dial marking, and means for securing said dial against further angular displacement relative to said knob following the engagement of said tongue within a selected notch.

3. A control device comprising a control shaft for setting the operational characteristics of said device, an operating knob for said shaft, an indexing device on said knob, means for securing said knob on said shaft against rotation relative thereto whereby rotation of said knob to effect a predetermined angular departure of said indexing device from a reference point will effect operation of said control device at a predetermined calibration condition, said knob having wall means defining a recess formed in a surface thereof transverse to the axis of said shaft, a portion of said wall means having a succession of notches arranged in an arc concentric with said shaft, one of said notches and said knob indexing device being disposed substantially along a common radius of said arc and each other of said notches being on radii having uniform angular departures from said common radius, a dial having a plurality of markings angularly arranged about at least a portion of the circumference thereof to indicate various operational settings for said control device, one of said markings having a predetermined fixed relation to the predetermined calibration condition, means for mounting said dial on said knob for rotation relative to said shaft, means for fixing the last-named dial marking in a desired angular relation to said one notch, comprising a sharp-pointed tongue on said dial engageable with any one of the notches on said knob, said tongue being symmetrically arranged relative to a radius of said dial passing through said one marking and having the apex of said tongue on said radius, and means for securing said dial against further angular displacement relative to said knob following the engagement of said tongue within a selected notch.

4. In a thermostat for operation at a selected temperature over a predetermined operating range, and including a rotatable control shaft for setting said thermostat for operation within said range, the combination comprising, a knob removably mounted on said shaft for rotating the same, the base wall of said knob being defined in part by an arcuate wall concentric with said shaft and comprehending a substantial portion of the circumference of said knob, the radially innermost wall portion of said wall having formed therein a plurality of notches, means on said base wall providing a visible reference circle concentric with said shaft, a dial having a plurality of radially extending markings arranged about the circumference thereof to indicate operational settings over the control range of said thermostat, one of said markings identifying a predetermined temperature against which said thermostat is to be calibrated, means for positioning said dial on said knob in a desired angular relation to said shaft to bring the said one marking into at least substantial coincidence with a reference point when said knob is rotated to effectuate operation of the thermostat at the calibration temperature, said means comprising arcuate wall means on said dial registrable with said reference circle, a tongue integral with said dial and extending along the radius of said one dial marking, said tongue having a pointed tip engageable with any of the notches of said knob, means for permitting tilting and rotation of said dial relative to said control shaft for temporary establishment of said tongue in any notch while maintaining said knob on said shaft for rotation of said shaft thereby and maintaining said dial on said knob, and means for securing said dial on said knob with the tongue in a fixed position with respect to a particular notch.

5. In a thermostat for operation at a selected temperature over a predetermined operating range, the combination comprising a rotatable control shaft for setting said thermostat for operation within said range, a knob removably mounted on said shaft for rotating the same, the base wall of said knob being defined in part by an arcuate wall concentric with said shaft and comprehending a substantial portion of the circumference of said knob, the radially innermost wall portion of said wall having formed therein a plurality of notches, a cylindrical hub fixed to said knob and extending axially from said base wall concentric with said shaft for non-rotatably receiving said shaft, a dial having a plurality of radially extending markings arranged about the circumference thereof to indicate operational settings over the control range of said thermostat, one of said markings corresponding to a predetermined temperature against which said thermostat is to be calibrated, means for positioning said dial on said knob in a desired angular relation to said shaft to bring the said one marking into at least substantial coincidence with a reference point when said knob is rotated to effectuate operation of the thermostat at the calibration temperature, said means comprising arcuate wall means on said dial snugly embracing said hub; a tongue integral with said dial and extending along the radius of said one dial marking, said tongue having a pointed tip engageable with any of the notches of said knob, means for permitting tilting and rotation of said dial relative to said knob and hub for temporary establishment of said tongue in any notch while maintaining said knob in shaft rotating position and maintaining said dial on said knob, and means for making said dial fast on said knob to retain a selected engagement of said tongue within a notch.

References Cited in the file of this patent

UNITED STATES PATENTS 2,179,281    Coultrip _____ Nov. 7, 1939